Dec. 22, 1970   D. J. REID   3,549,205
WHEEL
Filed Sept. 23, 1968
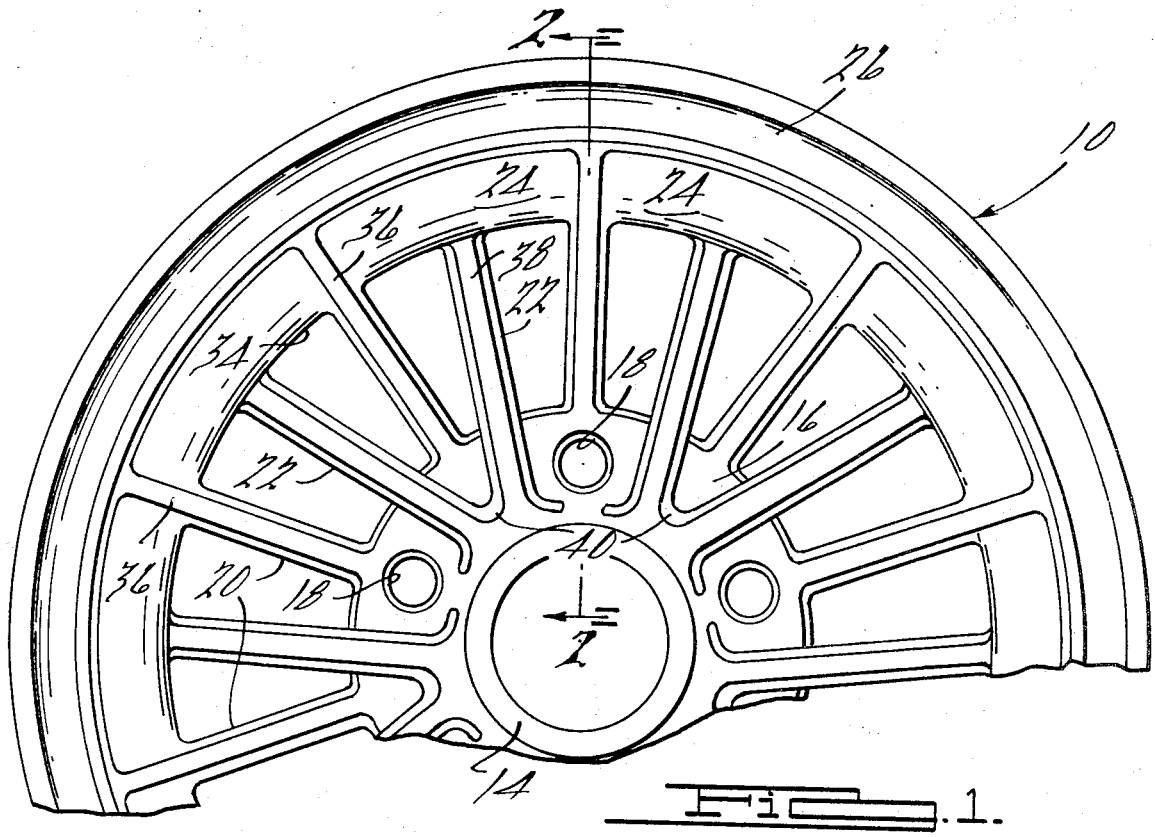
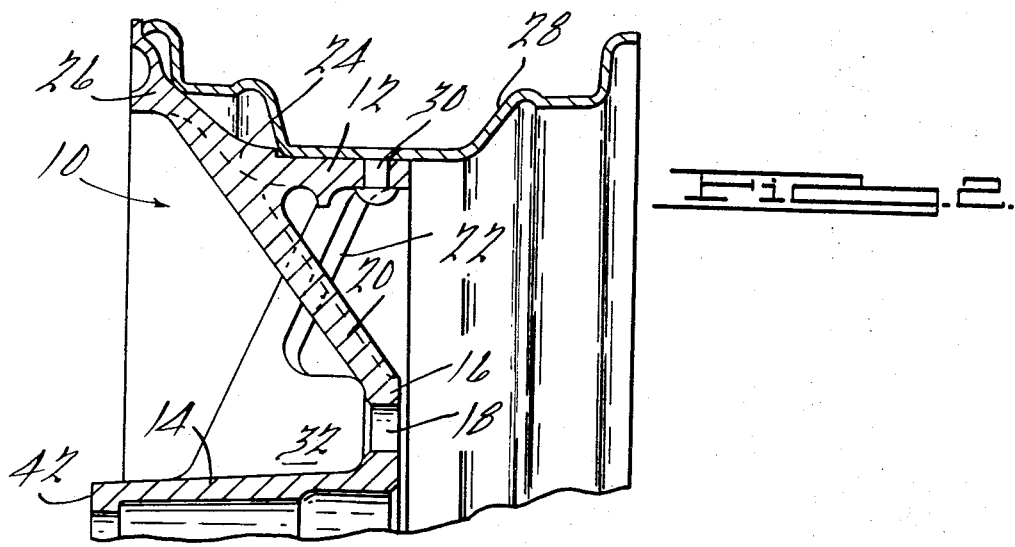
INVENTOR.
Donald J. Reid
BY
Barnes, Kisley & Pierce
ATTORNEYS.

United States Patent Office 3,549,205
Patented Dec. 22, 1970

3,549,205
WHEEL
Donald J. Reid, Pleasant Ridge, Mich., assignor to Kelsey-Hayes Company, Romulus, Mich., a corporation of Delaware
Filed Sept. 23, 1968, Ser. No. 761,419
Int. Cl. B60b 1/08
U.S. Cl. 301—65
7 Claims

ABSTRACT OF THE DISCLOSURE

An automobile wheel having a unitary cast body in which spokes connecting radially inner and outer portions of the body are cast as an integral part of the body structure.

SUMMARY OF THE INVENTION

The conventional automobile wheel consists of a stamped sheet metal body which is welded or riveted to a rim. The wheel body is fastened to a hub by means of wheel bolts and nuts. These fasteners, as well as the wheel body itself, are covered by a "wheel cover" of a desired ornamental appearance. In recent years, an increasing number of wheels have been sold which have bodies consisting of aluminum or magnesium alloy castings. Such castings serve to mount a conventional rim and are fastend to a hub with nuts and bolts in a conventional manner. However, the ornamental appearance of this type of wheel is designed into the casting itself and a separate wheel cover is not used. The wheel of the present invention falls into this general category.

The wheel of the present invention has a distinct ornamental appearance which is somewhat similar to the appearance of the spoked wheel. This appearance is achieved, however, through the use of a casting having a unique structural interrelationship of parts and affording several functional advantages. These advantages include: lightweight, very high structural strength, improved ventilation of the brake drum or disk, relatively modest cost, and accurate positioning of the rim.

According to the present invention, the wheel body includes an outer cylindrical rim mounting portion, a radially inner sleeve or barrel portion having a mounting flange at one end thereof, and alternately oppositely inclined spoke portions connecting said inner and outer portions. The foregoing spoke, inner and outer portions, comprise integral parts of a single casting. The arrangement affords room for properly located bolt holes as well as ventilating openings between the spokes, while at the same time providing the necessary structural strength and resistance to fatigue and imposed stresses.

DESCRIPTION OF THE DRAWINGS

FIG. 1 is a fragmentary front elevational view of a wheel embodying the present invention; and
FIG. 2 is a sectional view of the structure illustrated in FIG. 1, taken along the line 2—2 thereof.

DETAILED DESCRIPTION OF THE ILLUSTRATED EMBODIMENT

The wheel of the present invention includes a cast metal body, indicated generally at 10. The wheel body 10 is preferably made from an aluminum or magnesium alloy and has a generally cylindrical rim mounting portion 12 which spacedly surrounds a concentric mounting portion in the form of a sleeve 14 having a mounting flange 16 at the inboard end thereof. The mounting flange 16 is provided with circumferentially spaced bolt holes 18. The flanged sleeve 14 and rim mounting portion 12 are interconnected by means of two alternately arranged sets of spokes. A first set of spokes 20 extends from the flange 16 in a radially and axially outwardly inclined direction to the rim supporting portion 12. A second set of spokes 22 extends from the sleeve 14 and flange 16 in a radially outwardly and axially inwardly inclined direction to the cylindrical rim supporting portion 12.

The outer ends of the spokes 20 and the rim mounting portion 12 blend together as indicated at 24. The wheel portion 24 terminates in an outer peripheral wheel portion 26 which covers a rim 28. The rim 28 seats on and is supported by the rim mounting portion 12 and is connected thereto by rivets 30.

The spokes 22 have axially elongated portions 32 at their radially inner ends which unite the spokes 22 with both the main tubular portion of the sleeve 14 and with the flange 16. It will be seen, however, that the axial dimension of the spokes 22 in a location radially outwardly of the flange 16 is considerably reduced relative to the spoke portions 32. The wheel body 10 is formed with openings 34 which extend between the spokes 22 to provide extensive ventilation for an associated brake drum or disk (not shown). Each opening 34 is bisected by a spoke 20 as the wheel is viewed in front elevation. However, the spokes 20, being of relatively narrow circumferential dimension, do not substantially impair the flow of air through the openings 34.

The entire wheel is desirably sandblasted after it is cast in order to improve its surface appearance. Further, outboard surfaces 36 of the spokes 20 and outboard surfaces 38 of the spokes 22 are buffed to emphasize such surfaces over the surrounding portions of the wheel. It will be noted that each spoke 22 is paired with an adjacent spoke 22, with each pair of adjacent spokes 22 converging together at a common location indicated at 40 in FIG. 1. The spokes 22 of each pair diverge outwardly away from one another. Accordingly, the spokes 22 are not disposed on radii of the wheel. In contrast, the spokes 20 are oriented radially of the wheel.

The flange 16, with its associated sleeve 14 defines a mounting portion for the wheel with the flange 16 being secured to the flange of a conventional wheel hub (not shown) by means of wheel bolts (not shown) passing through the bolt holes 18. Of course, the hub may have studs passing through the holes 18 with nuts being threaded on said studs. Such fasteners are well known in the art and are not illustrated in the drawings. The sleeve 14 spacedly surrounds the wheel hub and an outboard end 42 of the sleeve 14 may be closed with a relatively simple hub cap (not shown).

It will be appreciated that the arrangement of the spokes 20 and 22 is such as to resist a variety of stresses or loads applied to the wheel while at the same time affording ample cooling for an associated brake drum or disk. In addition, the utilization of the spaced spokes 20 and 22 provides the wheel with an overall weight which compares extremely favorably with other cast wheels. It is to be appreciatd that although the wheel of the present invention does have a somewhat similar appearance to the spoked wheel, the wheel of the present invention may be manufactured at a fraction of the cost of a spoked wheel. Of course, the rim mounting portion 12 may be machined to extremely accurate dimensions to provide proper positioning for the rim 28.

I claim:
1. A wheel structure including a unitary cast wheel body comprising a central sleeve portion having a mounting flange at the inboard side thereof, a cylindrical rim supporting portion spacedly surrounding said sleeve and flange, a first set of spokes extending between said cylindrical portion and said flange, and a second set of spokes extending between said cylindrical portion and said sleeve portion, said first and second sets of spokes being alternately arranged in a circumferential direction and being axially oppositely inclined, the spokes of said first set crossing along their lengths with and having axially displaced ends relative to the spokes of said second set, said wheel structure including a stamped sheet metal rim fixed to said rim supporting portion.

2. The structure set forth in claim 1, wherein the spokes of said second set are arranged in pairs with the spokes of each pair being joined adjacent their radially inner ends and diverging away from one another toward said cylindrical portion.

3. The structure set forth in claim 1 in which said flange is provided with fastener receiving openings in axial alignment with spaces between adjacent pairs of said second set of spokes.

4. The structure set forth in claim 1, in which ventilating openings are provided between the spokes of said first set.

5. The structure set forth in claim 1, in which said stamped sheet metal rim is riveted to said rim supporting portion.

6. The structure set forth in claim 1, in which the spokes of said second set are provided with axially elongated portions at their radially inner ends which extend between said sleeve portion and said flange.

7. A unitary cast metal wheel body comprising a central sleeve portion having a mounting flange at the inboard side thereof, a cylindrical rim supporting portion spacedly surrounding said sleeve and flange, a first set of spokes extending between said cylindrical portion and said flange, and a second set of spokes extending between said cylindrical portion and said sleeve portion, said first and second sets of spokes being alternately arranged in a circumferential direction and being axially oppositely inclined, a stamped sheet metal rim is riveted to said rim supporting portion, the spokes of said second set are provided with axially elongated portions at their radially inner ends which extend between said sleeve portion and said flange.

References Cited

UNITED STATES PATENTS

| | | | |
|---|---|---|---|
| 1,824,752 | 9/1931 | Swain | 301—96X |
| 2,020,866 | 11/1935 | Ash | 29—159.02X |
| 1,468,085 | 9/1923 | Schenck | 301—65 |
| 1,524,745 | 2/1925 | Morgan | 301—65 |
| 2,008,933 | 7/1935 | Sinclair | 301—65 |
| 3,346,301 | 10/1967 | Hurst | 301—65 |
| 3,399,930 | 9/1968 | Bennett | 301—65 |

RICHARD J. JOHNSON, Primary Examiner